(12) United States Patent
Choi et al.

(10) Patent No.: US 9,991,520 B2
(45) Date of Patent: Jun. 5, 2018

(54) FLEXIBLE SECONDARY BATTERY

(71) Applicant: KOREA INSTITUTE OF SCIENCE AND TECHNOLOGY, Seoul (KR)

(72) Inventors: Insuk Choi, Seoul (KR); Kee Bum Kim, Seoul (KR); Kyu Hwan Oh, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 50 days.

(21) Appl. No.: 15/299,638

(22) Filed: Oct. 21, 2016

(65) Prior Publication Data
US 2017/0117553 A1   Apr. 27, 2017

(30) Foreign Application Priority Data

Oct. 21, 2015   (KR) .................. 10-2015-0146662

(51) Int. Cl.
*H01M 4/70*   (2006.01)
*H01M 2/02*   (2006.01)
*H01M 4/02*   (2006.01)

(52) U.S. Cl.
CPC ............ *H01M 4/70* (2013.01); *H01M 2/028* (2013.01); *H01M 2/0275* (2013.01); *H01M 2004/025* (2013.01); *H01M 2220/30* (2013.01)

(58) Field of Classification Search
CPC ...... H01M 4/70; H01M 2/0275; H01M 2/028; H01M 2004/025; H01M 2220/30
See application file for complete search history.

(56) References Cited

U.S. PATENT DOCUMENTS 8,962,179 B2   2/2015   Ahn

FOREIGN PATENT DOCUMENTS

| JP | 2014-53209 A | 3/2014 |
|---|---|---|
| KR | 10-2012-0021205 A | 3/2011 |
| WO | WO 2014/038455 A1 | 3/2014 |

OTHER PUBLICATIONS

Korean Office Action dated Oct. 21, 2016 in Korean Patent Application No. 10-2015-0146662 (29 pages in Korean).

*Primary Examiner* — Jane Rhee
(74) *Attorney, Agent, or Firm* — NSIP Law

(57) ABSTRACT

A flexible secondary battery includes an exterior member having an accommodation space inside, a cathode collector and an anode collector located in the accommodation space and spaced apart from each other, a cathode active material portion on the cathode collector, and an anode active material portion on the anode collector. The cathode collector includes a first connection portion extending in a first direction and a plurality of first leg portions protruding from the first connection portion in a second direction different from the first direction. The anode collector includes a second connection portion parallel to the first connection portion and a plurality of second leg portions protruding from the second connection portion toward the first connection portion. The first leg portions and the second leg portions are alternately arranged between the first connection portion and the second connection portion. The cathode active material portion is located only on the first leg portions. The anode active material portion is located on the second connection portion and the second leg portions.

15 Claims, 13 Drawing Sheets

FLEXIBLE SECONDARY BATTERY

CROSS-REFERENCE TO RELATED APPLICATION

This application claims the benefit of Korean Patent Application No. 10-2015-0146662, filed on Oct. 21, 2015, in the Korean Intellectual Property Office, the disclosure of which is incorporated herein in its entirety by reference.

BACKGROUND

1. Field

One or more embodiments relate to a flexible secondary battery.

2. Description of the Related Art

Secondary batteries are rechargeable batteries that are repeatedly charged and discharged, unlike primary batteries that are not rechargeable. Since the secondary batteries are economical and eco-friendly, use of a secondary battery has been encouraged. Recently, there are a variety of types of electronic apparatuses using secondary batteries. For example, various wearable computer technologies using a secondary battery as a power supply source, and applied examples thereof, have been developed and published. Also, electronic apparatuses such as mobile phones and laptop computers are designed to have certain curved surfaces for ergonomic design.

Secondary batteries to operate these electronic apparatuses are required to have not only a superior performance, but also a flexible shape so that the secondary batteries are variously deformed according to the shapes of electronic apparatuses using the secondary batteries.

SUMMARY

One or more embodiments include a flexible secondary battery.

Additional aspects will be set forth in part in the description which follows and, in part, will be apparent from the description, or may be learned by practice of the presented embodiments.

According to one or more embodiments, a flexible secondary battery includes an exterior member having an accommodation space inside, a cathode collector and an anode collector located in the accommodation space and spaced apart from each other, a cathode active material portion on the cathode collector, and an anode active material portion on the anode collector, in which the cathode collector includes a first connection portion extending in a first direction and a plurality of first leg portions protruding from the first connection portion in a second direction different from the first direction, the anode collector includes a second connection portion parallel to the first connection portion and a plurality of second leg portions protruding from the second connection portion toward the first connection portion, the first leg portions and the second leg portions are alternately arranged between the first connection portion and the second connection portion, the cathode active material portion is located only on the first leg portions, and the anode active material portion is located on the second connection portion and the second leg portions.

One end of the cathode active material portion close to the first connection portion may be located on a same line as one end of each of the plurality of second leg portions close to the first connection portion, or closer to the second connection portion than one end of each of the plurality of second leg portions.

A shortest distance between the one end of the cathode active material portion and the same line may be equal to or less than about 50% of a shortest distance between the one end of each of the plurality of second leg portions and the first connection portion.

One end of the cathode active material portion close to the first connection portion may be located closer to the first connection portion than the one end of each of the plurality of second leg portions close to the first connection portion, and a shortest distance between the one end of the cathode active material portion and the first connection portion may be greater than about 50% of a shortest distance between the one end of each of the plurality of second leg portions and the first connection portion.

The cathode collector and the anode collector may be arranged on a same plane.

An area of the plurality of first leg portions may be larger than an area of the cathode active material portion.

The plurality of first leg portions and the plurality of second leg portions may be parallel to each other, and a gap between the plurality of first leg portions and the plurality of second leg portions may be greater than about 0.5 mm and equal to or less than about 1 mm.

A width of each of the plurality of first leg portions and a width of each of the plurality of second leg portions may range from about 1 mm to about 3 mm.

The width of each of the plurality of first leg portions and the width of each of the plurality of second leg portions may be the same.

A ratio of a length and a width of each of the plurality of first leg portions and each of the plurality of second leg portions may range from about 10:1 to about 200:1.

A cathode tab and an anode tab may be respectively connected to the cathode collector and the anode collector, and the cathode tab and the anode tab may be exposed to outside of the exterior member.

The exterior member may include a first exterior member and a second exterior member, the first exterior member and the second exterior member may be bonded to each other at edges of the first exterior member and the second exterior member, and an insulating film may be attached to outer surfaces of the cathode tab and the anode tab, contacting the first exterior member and the second exterior member.

One end of each of the plurality of second leg portions may have a round shape.

A width of each of the plurality of first leg portions gradually may increase from the second connection portion toward the first connection portion and a width of each of the plurality of second leg portions may gradually increase from the first connection portion toward the second connection portion.

The first direction and the second direction may be perpendicular to each other.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
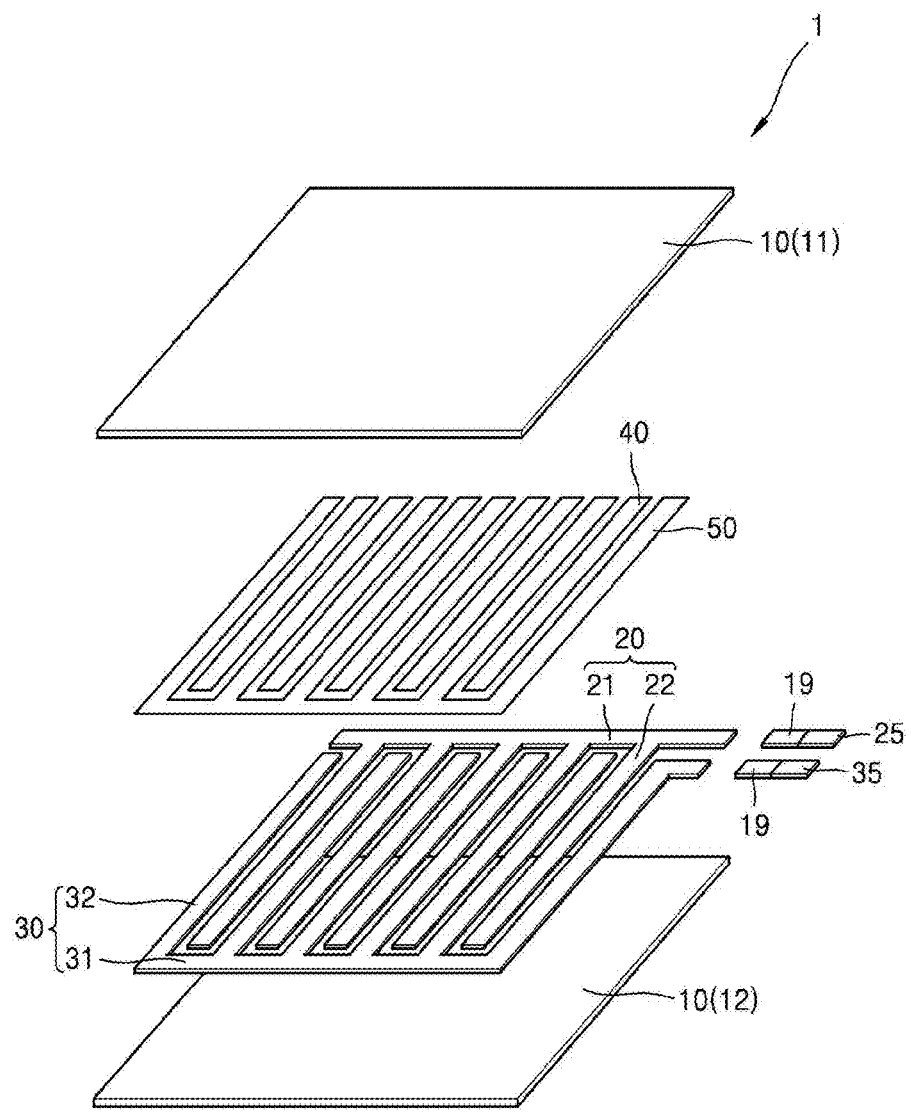
FIG. 1 is a schematic exploded perspective view of a flexible secondary battery according to an embodiment.

Reference will now be made in detail to embodiments, examples of which are illustrated in the accompanying drawings, wherein like reference numerals refer to like elements throughout and redundant explanations are omitted. In this regard, the present embodiments may have different forms and should not be construed as being limited to the descriptions set forth herein. Accordingly, the embodiments are merely described below, by referring to the figures, to explain aspects of the present description.

Terms such as "first" and "second" are used herein merely to describe a variety of constituent elements, but the constituent elements are not limited by the terms. Such terms are used only for the purpose of distinguishing one constituent element from another constituent element.

In the following embodiment, the expression of singularity in the present specification includes the expression of plurality unless clearly specified otherwise in context.

Terms such as "include" or "comprise" may not be construed to necessarily include any and all constituent elements or steps described in the specification, but may be construed to exclude some of the constituent elements or steps or further include additional constituent elements or steps.

In the following embodiment, when an element is described to exist "above" or "on" another element, the element may exist directly on the other element or a third element may be interposed therebetween.

In the drawings, the sizes of the elements may be illustrated to be exaggerated or contracted for convenience of explanation. For example, since the sizes and thicknesses of each element in the drawings are illustrated for convenience of explanation, the present disclosure is not limited thereto.

Figure 2:
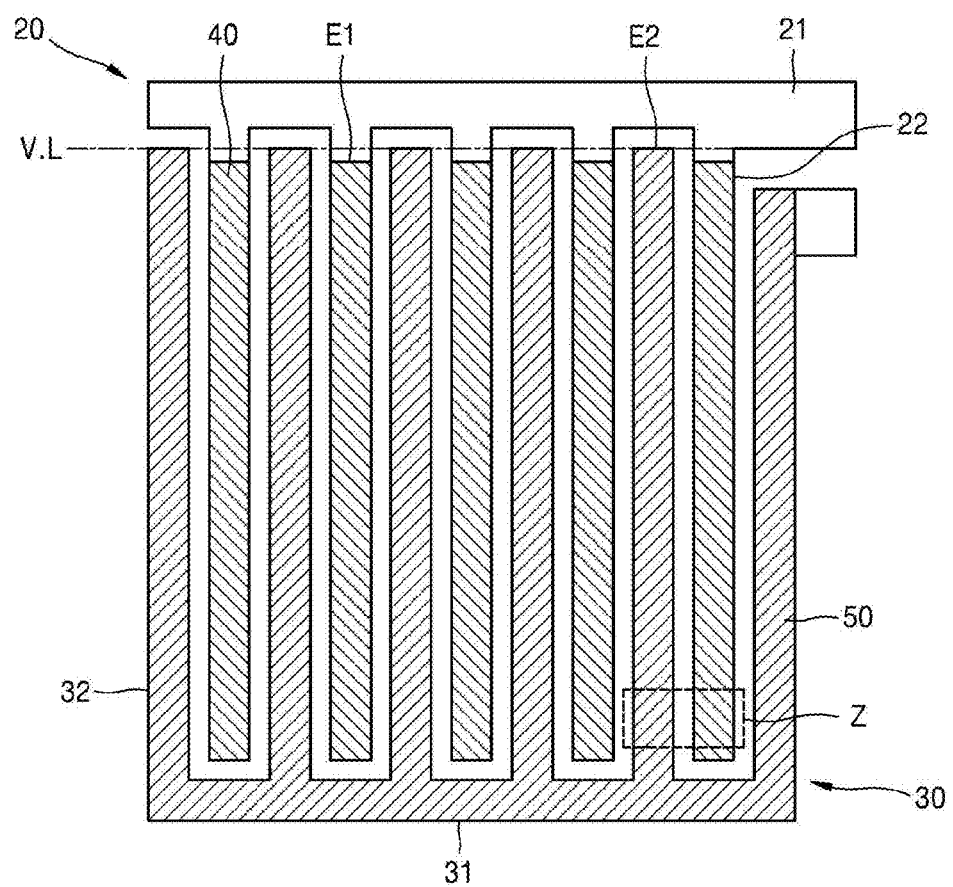
FIG. 2 is a schematic plan view of a cathode collector and an anode collector of FIG. 1.
Figure 3A:
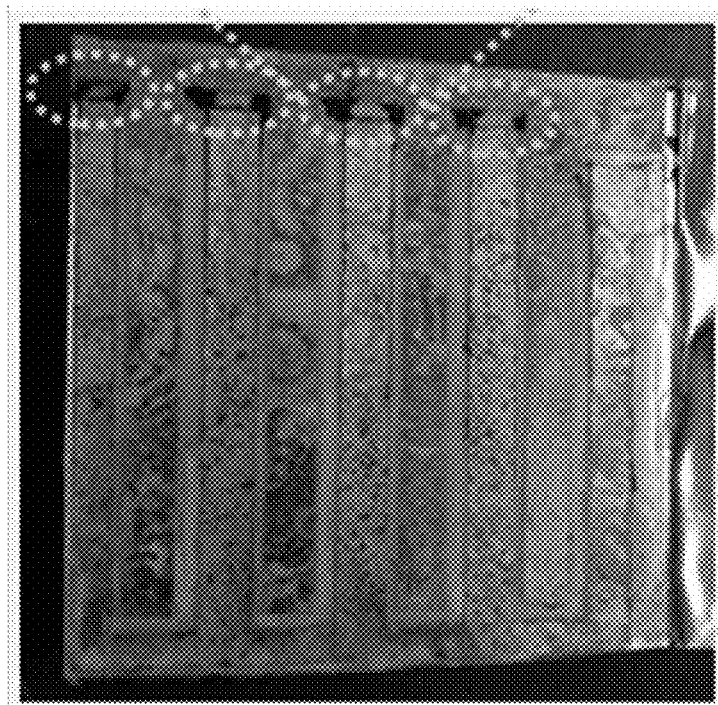
FIG. 3A is an image showing a lithium extraction phenomenon at the anode collector of FIG. 1.
Figure 3B:
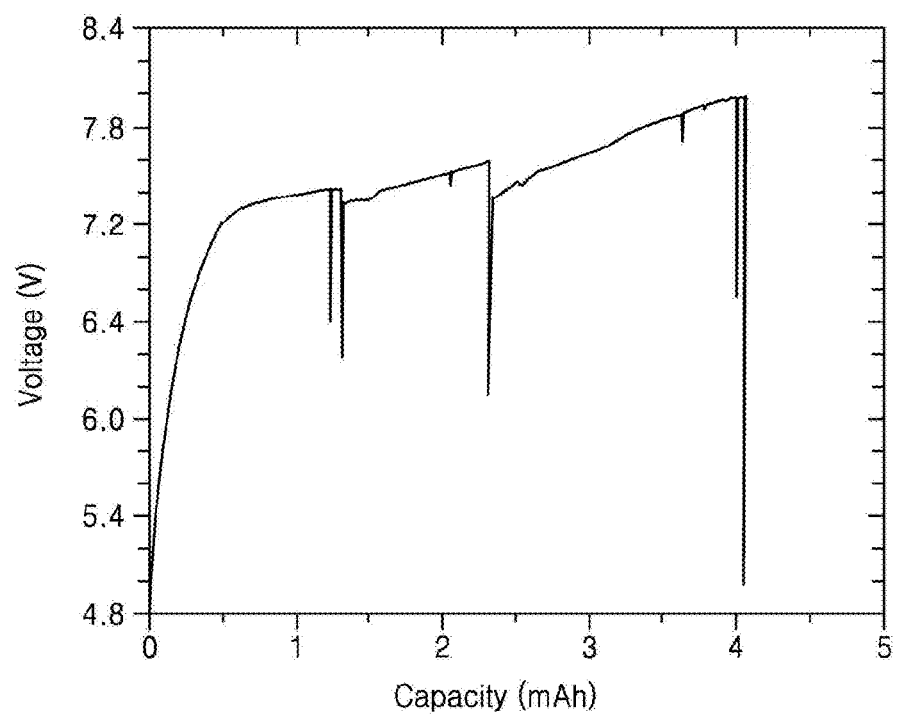
FIG. 3B is a graph showing performance of the flexible secondary battery of FIG. 1 in the case of FIG. 3A.
Figure 4A:
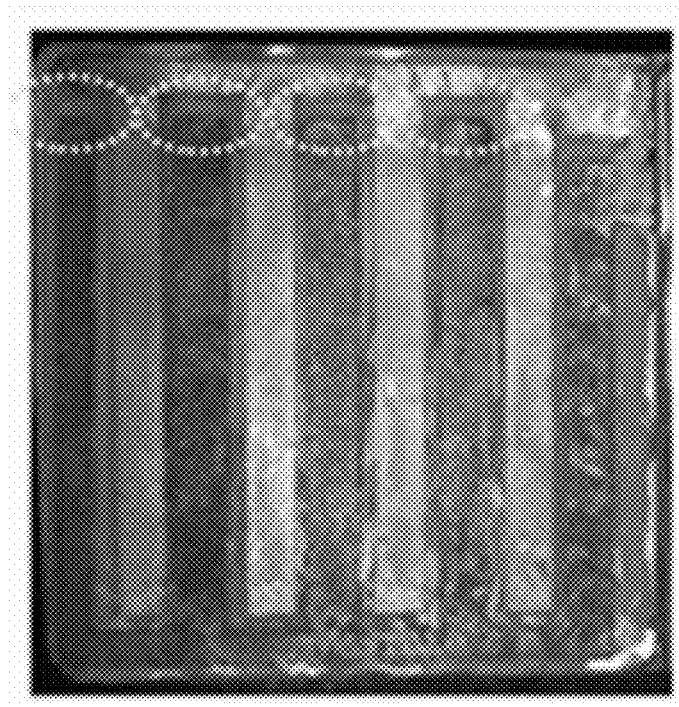
FIG. 4A is an image showing a lithium extraction phenomenon at the anode collector of FIG. 1.
Figure 4B:
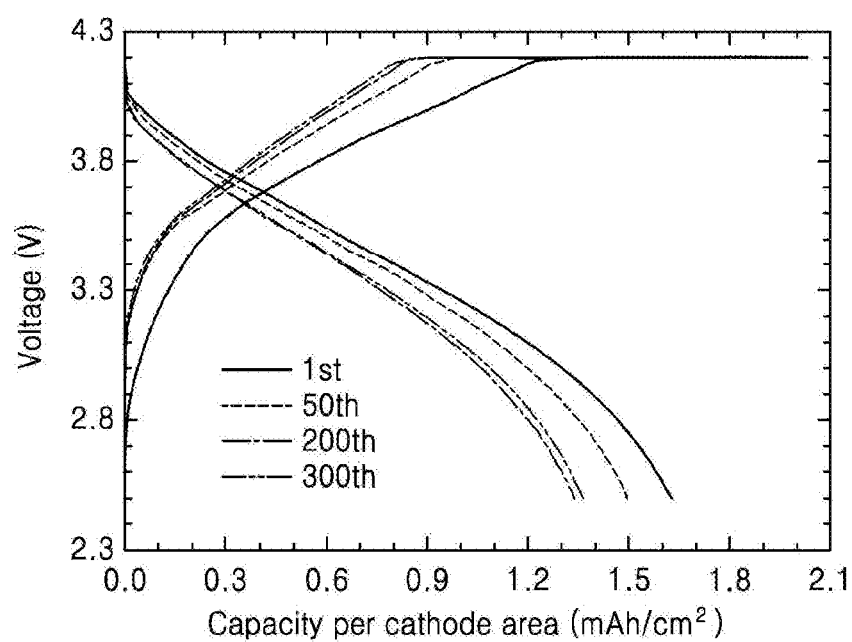
FIG. 4B is a graph showing performance of the flexible secondary battery of FIG. 1 in the case of FIG. 4A.

FIG. 1 is a schematic exploded perspective view of a flexible secondary battery 1 according to an embodiment. FIG. 2 is a schematic plan view of a cathode collector and an anode collector of FIG. 1. FIG. 3A is an image showing a lithium extraction phenomenon at the anode collector of FIG. 1. FIG. 3B is a graph showing performance of the flexible secondary battery 1 of FIG. 1 in the case of FIG. 3A. FIG. 4A is an image showing a lithium extraction phenomenon at the anode collector of FIG. 1. FIG. 4B is a graph showing performance of the flexible secondary battery 1 of FIG. 1 in the case of FIG. 4A.

Referring to FIGS. 1 to 4B, the flexible secondary battery 1 according to the present embodiment may include an exterior member 10 having an accommodation space inside, and a cathode collector 20 and an anode collector 30 located in the accommodation space of the exterior member 10.

Also, a cathode terminal 25 and an anode terminal 35 are respectively connected to the cathode collector 20 and the anode collector 30. A cathode active material portion 40 may be located at the cathode collector 20, whereas an anode active material portion 50 may be located at the anode collector 30.

The exterior member 10 may include a first exterior member 11 and a second exterior member 12. The first exterior member 11 and the second exterior member 12 are combined to each other at the edges thereof, hermetically sealing the accommodation space. The accommodation space may accommodate an electrolyte in addition to the cathode collector 20 and the anode collector 30. The accommodation space may be formed by performing a drawing process on at least one of the first exterior member 11 and the second exterior member 12.

The first exterior member 11 and the second exterior member 12 may have flexibility. For example, the first exterior member 11 and the second exterior member 12 may have a triple layer structure of an insulating layer, a metal layer, and an insulating layer. For example, the metal layer may be formed of aluminum, steel, or stainless steel, and the insulating layer may be formed of casting polypropylene (CPP), polyethylene terephthalate (PET), nylon, or polyimide, but the present disclosure is not limited thereto.

Although not illustrated in the drawings, one side of the first exterior member 11 and one side of the second exterior member 12 may be continuously formed with each other. For example, after the cathode collector 20 and the anode collector 30 are placed on the second exterior member 12, the first exterior member 11 that is continuously formed from one side of the second exterior member 12 is bent over the second exterior member 12 and then an edge of the first exterior member 11 and an edge of the second exterior member 12, contacting each other, may be bonded to each other.

The cathode collector 20 and the anode collector 30 may be arranged on the same plane by being spaced apart from each other. Accordingly, the flexible secondary battery 1 does not need a separator to insulate the cathode collector 20 and the anode collector 30 and the cathode collector 20 and the anode collector 30 do not have a stack structure. Thus, the flexible secondary battery 1 may be implemented to have a relatively thin thickness.

The cathode collector 20 may be formed of a metal foil and may be fixedly placed in the exterior member 10 by using an adhesive layer such as a double-sided adhesive tape. For example, the cathode collector 20 may be formed of an aluminum foil. However, the present disclosure is not limited thereto, and various materials, such as nickel or SUS, exhibiting a low electric resistance and a superior electrochemical endurance may be used for the cathode collector 20.

The cathode collector 20 may include a first connection portion 21 extending in a first direction and a plurality of first leg portions 22 protruding from the first connection portion 21 in a second direction that is different from the first direction. The second direction may be perpendicular to the first direction. The first connection portion 21 and the first leg portions 22 may be integrally formed and the first leg portions 22 may be arranged by being spaced apart a distance from each other.

The anode collector 30 may be formed of a metal foil such as a copper foil and may be fixedly placed in the exterior member 10 by an adhesive layer such as a double-sided adhesive tape. In another example, the anode collector 30 may be formed of various materials, such as nickel or SUS, having a low electric resistance and a superior electrochemical endurance.

The anode collector 30 may include a second connection portion 31 and a plurality of second leg portions 32 protruding from the second connection portion 31. The second connection portion 31 and the second leg portions 32 may be integrally formed.

The second connection portion 31 may be provided parallel to and spaced apart a distance from the first connection portion 21.

The second leg portions 32 may be spaced apart a distance from each other and protrude toward the first connection portion 21. The second leg portions 32 may be arranged parallel to and between the first leg portions 22. In other words, the first leg portions 22 and the second leg portions 32 may be alternately arranged between the first connection portion 21 and the second connection portion 31. Accordingly, a movement distance of electric charges may be reduced and thus internal resistance of the flexible secondary battery 1 may be reduced.

In another example, the cathode collector 30 and the anode collector 40 may be manufactured by a printing method. For example, the cathode collector 20 and the anode collector 30 may be manufactured by a method of coating an ink including conductive powder on a surface of the first exterior member 11 or the second exterior member 12 and then drying a coated surface. A conductive ink may be manufactured by mixing a binder, a solvent, and conductive powder. The conductive powder may be carbon powder, silver powder, copper powder, nickel powder, SUS powder, or a mixture of two or more powders of the above powers.

A cathode tab 25 and an anode tab 35 are respectively connected to the cathode collector 20 and the anode collector 30. The cathode tab 25 may be formed of, for example, aluminum, and the anode tab 35 may be formed of, for example, nickel.

The cathode tab 25 and the anode tab 35 may be exposed to the outside between the first exterior member 11 and the second exterior member 12. An insulating film 19 may be attached to an outer surface of each of the cathode tab 25 and the anode tab 35 contacting the first exterior member 11 and the second exterior member 12, to improve a bonding force with the exterior member 10 and prevent a short-circuit between the cathode tab 25 and the anode tab 35.

The cathode active material portion 40 and the anode active material portion 50 may be respectively formed on the cathode collector 20 and the anode collector 30. The cathode active material portion 40 and the anode active material portion 50 may be formed both sides of each of the cathode collector 20 and the anode collector 30.

The cathode active material portion 40 may be formed of a lithium-containing transition metal oxide such as $LiCoO_2$, $LiNiO_2$, $LiMnO_2$, and $LiMnO_4$, or a lithium chalcogenide compound. The anode active material portion 50 may be formed of a carbon material such as crystalline carbon, amorphous carbon, carbon composite, or carbon fiber, lithium metal, a lithium oxide, or a lithium alloy.

The anode active material portion 50 may be formed on the second connection portion 31 and the second leg portions 32. In contrast, the cathode active material portion 40 may be formed on the first leg portions 22 only. In other words, the cathode active material portion 40 is not formed on the first connection portion 21. Accordingly, even when the first leg portions 22 and the second leg portions 32 are formed to have the same width, the area of the anode active material portion 50 may be larger than that of the cathode active material portion 40. Accordingly, since the quantity of lithium ions received by the anode active material portion 50 is larger than the quantity of lithium ions provided by the cathode active material portion 40, the flexible secondary battery 1 may be stably charged/discharged.

The area of the cathode active material portion 40 may be smaller than that of the first leg portions 22. For example, one end E1 of the cathode active material portion 40 close to the first connection portion 21 may be located on the same line V.L as one end E2 of each of the second leg portions 32 close to the first connection portion 21, or to be closer to the second connection portion 31 or the first connection portion 21 than the one end E2 of each of the second leg portions 32 with respect to the same line V.L.

For example, when the one end E1 of the cathode active material portion 40 is located closer to the second connection portion 31 than the one end E2 of each of the second leg portions 32, to prevent the area of the cathode active material portion 40 from being excessively reduced, a shortest distance between the one end E1 of the cathode active material portion 40 and the same line V.L may be 50% or less than the shortest distance between the one end E2 of each of the second leg portions 32 and the first connection portion 21. The shortest distance between the one end E2 of each of the second leg portions 32 and the first connection portion 21 may be greater than about 0.5 mm and equal to or less than about 1 mm.

In another example, when the one end E1 of the cathode active material portion 40 is located closer to the one end E2 of each of the second leg portions 32 than the first connection portion 21, the shortest distance between the one end E1 of the cathode active material portion 40 and the first connection portion 21 may be greater than 50% of the shortest distance between the one end E2 of each of the second leg portions 32 and the first connection portion 21. In other words, the shortest distance between the one end E1 of the cathode active material portion 40 and the same line V.L may be equal to or less than 50% of the shortest distance between the one end E2 of each of the second leg portions 32 and the first connection portion 21.

Accordingly, the one end E2 of each of the second leg portions 32 coated with the anode active material portion 50 is prevented from being surrounded by the cathode collector 20 coated with cathode active material portion 40. Accordingly, the growth of dendrite due to extraction of lithium ions at the corner of the one end E2 of each of the second leg portions 32, where lithium ions are easily concentrated during charge, may be prevented.

FIGS. 3A and 4A are images showing a lithium extraction phenomenon at the anode collector 30 of FIG. 1. FIGS. 3B and 4B are graphs showing performance of the flexible secondary battery 1 of FIG. 1 in the cases of FIGS. 3A and 4A.

Referring to FIGS. 3A and 4A, the cathode collector 20 and the anode collector 30 each are about 37 mm long in the second direction perpendicular to the first connection portion 21 and the second connection portion 31, and the width of each of the first leg portions 22 and the second leg portions 32 is about 2 mm. Also, the first leg portions 22 and the second leg portions 32 are spaced apart by about 1 mm from each other. However, although FIG. 3A illustrates that the cathode active material portion 40 is formed on the first connection portion 21 and the first leg portions 22 of the cathode collector 20, in FIG. 4A, as in the present embodiment, the cathode active material portion 40 is formed to have an area smaller than the first leg portions 22.

Referring to FIG. 3A, it may be seen that, as a result of the one end E2 of each of the second leg portions 32 being surrounded by the cathode collector 20 coated with the cathode active material portion 40, dendrite grows due to the extraction of lithium ions at the corner of the one end E2 of each of the second leg portions 32. As such, when dendrite grows, the electric capacity of the flexible secondary battery 1 may be decreased and, as illustrated in FIG. 3B, a temporary voltage drop phenomenon according to an increase in the electric capacity during charge may occur. Also, the cathode collector 20 and the anode collector 30 may be short-circuited by dendrite.

In contrast, in the case of FIG. 4A, dendrite does not grow and, as illustrated in FIG. 4B, superior battery properties without a voltage drop phenomenon may be obtained in a charge/discharge test performed about 300 times. Accordingly, since the cathode active material portion 40 is formed only on the first leg portions 22, the one end E2 of each of the second leg portions 32 coated with the anode active material portion 50 being surrounded by the cathode active material portion 40 may be prevented and thus the generation of dendrite in the one end E2 of each of the second leg portions 32 may be prevented. Accordingly, the voltage drop phenomenon and the electric capacity variation phenomenon of the flexible secondary battery 1 due to the formation of dendrite may be prevented and thus stable capacity and stability may be secured.

Figure 5:
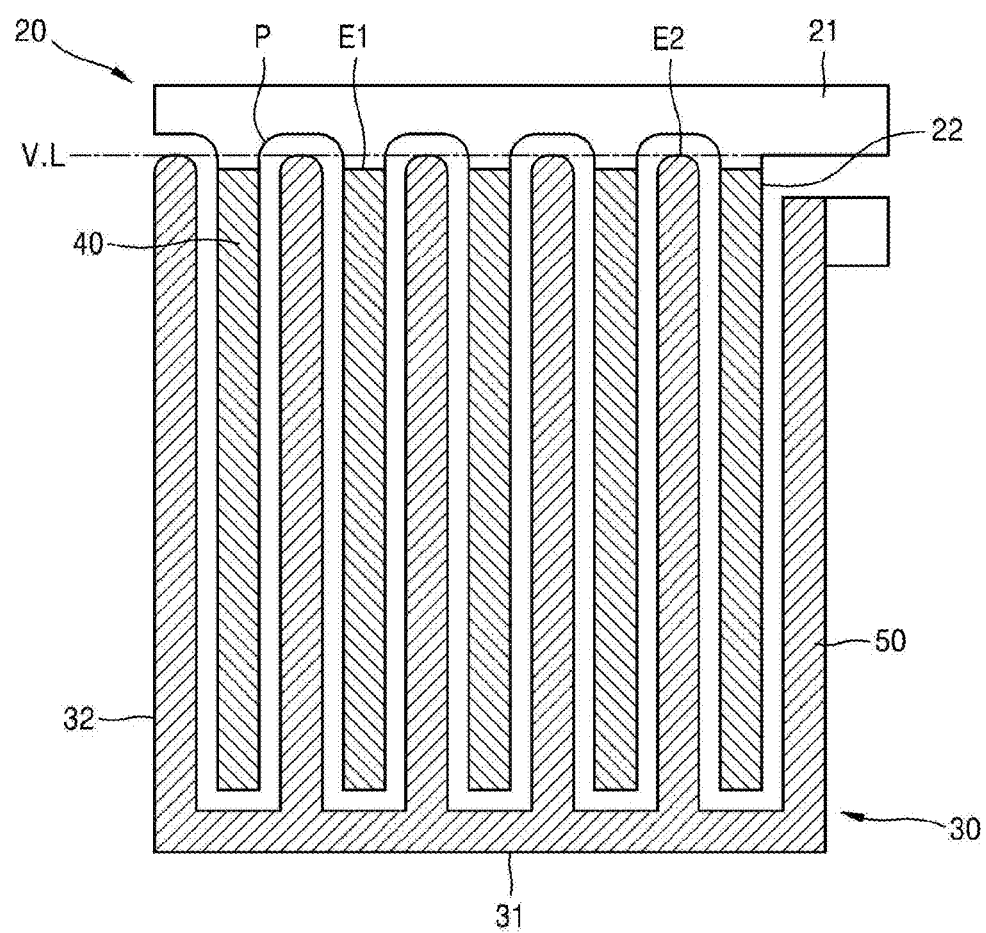
FIG. 5 is a schematic plan view of another example of the cathode collector and the anode collector of FIG. 2.
Figure 6:
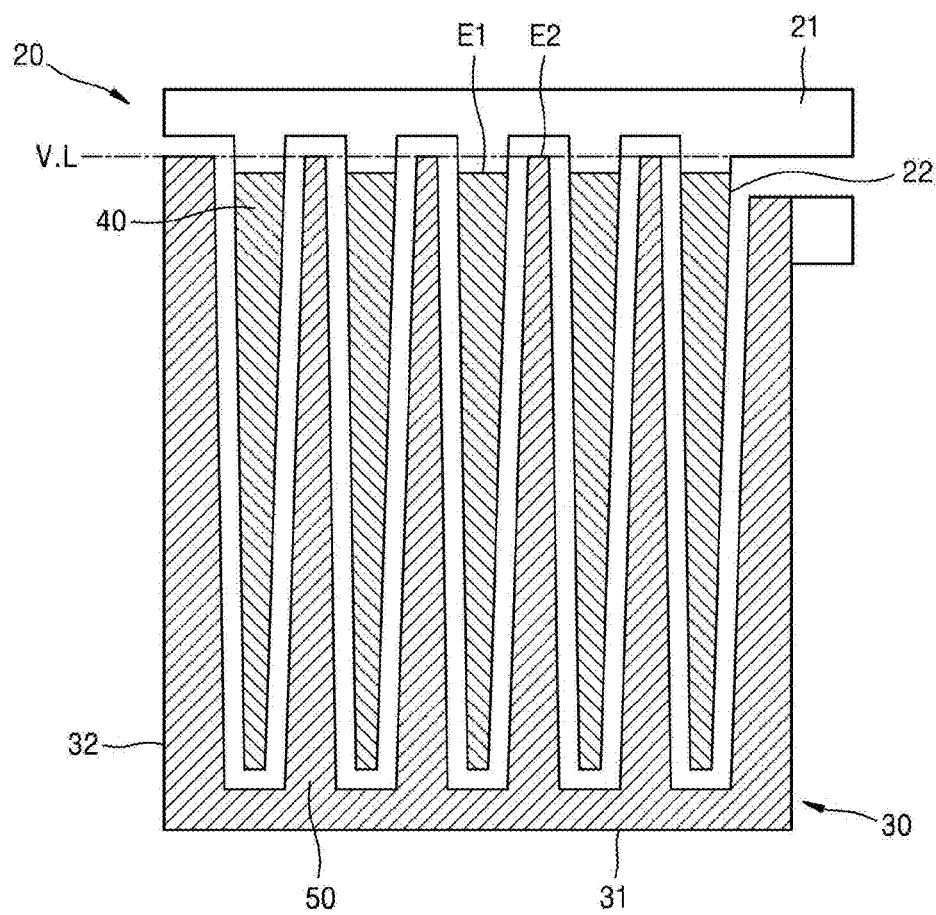
FIG. 6 is a schematic plan view of another example of the cathode collector and the anode collector of FIG. 2.

FIG. 5 is a schematic plan view of another example of the cathode collector 20 and the anode collector 30 of FIG. 2. FIG. 6 is a schematic plan view of another example of the cathode collector 20 and the anode collector 30 of FIG. 2.

Referring to FIG. 5, the cathode collector 20 and the anode collector 30 are arranged on the same plane by being spaced apart from each other.

The cathode collector 20 may include the first leg portions 22 protruding toward the second connection portion 31 from the first connection portion 21 and the first connection portion 21.

The anode collector 30 may include the second connection portion 31 parallel to the first connection portion 21 and the second leg portions 32 protruding from the second connection portion 31 toward the first connection portion 21. In this state, the second leg portions 32 may be alternately arranged with the first leg portions 22.

The cathode active material portion 40 and the anode active material portion 50 may be respectively formed on the cathode collector 20 and the anode collector 30. The cathode active material portion 40 may be formed only on the first leg portions 22, and the anode active material portion 50 may be formed on the second connection portion 31 and the second leg portions 32.

In detail, the one end E1 of the cathode active material portion 40 close to the first connection portion 21 may be located on the same line V.L as the one end E2 of each of the second leg portions 32 close to the first connection portion 21, or closer to the second connection portion 31 or the first connection portion 21 than the one end E2 of each of the second leg portions 32. In this state, the shortest distance between the one end E1 of the cathode active material portion 40 and the same line V.L may be 50% or less than the shortest distance between the one end E2 of each of the second leg portions 32 and the first connection portion 21.

Accordingly, the one end E2 of each of the second leg portions 32 coated with the anode active material portion 50 may be prevented from being surrounded by the cathode collector 20 coated with the cathode active material portion 40. Thus, growth of dendrite due to the extraction of lithium ions at the corner of the one end E2 of each of the second leg portions 32 where the lithium ions are easily concentrated during charge may be prevented, and an excessive decrease in the coating amount of the cathode active material portion 40 may be prevented.

Also, the one end E2 of each of the second leg portions 32 may have a round shape. In other words, the growth of dendrite due to the extraction of lithium ions may be further effectively prevented by removing or reducing a sharp shape, where lithium ions are easily concentrated, of the one end E2 of each of the second leg portions 32. In this state, an area P of the first connection portion 21 corresponding to each of the second leg portions 32 may be formed to be curved.

Referring to FIG. 6, the cathode collector 20 including the first connection portion 21 and the first leg portions 22 and the anode collector 30 including the second connection portion 31 and the second leg portions 32 may be arranged on the same plane, and the cathode active material portion 40 and the anode active material portion 50 may be respectively formed on the cathode collector 20 and the anode collector 30.

Although the anode active material portion 50 is formed on the second connection portion 31 and the second leg portions 32 of the anode collector 30, the cathode active material portion 40 may be formed on the first leg portions 22 to have an area smaller than the area of the first leg portions 22. In other words, the one end E1 of the cathode active material portion 40 close to the first connection portion 21 may be located on the same line V.L as the one end E2 of each of the second leg portions 32 close to the first connection portion 21, or closer to the second connection portion 31 or the first connection portion 21 than the one end E2 of each of the second leg portions 32. The shortest distance between the one end E1 of the cathode active material portion 40 and the same line V.L may be 50% or less than the shortest distance between the one end E2 of each of the second leg portions 32 and the first connection portion 21.

The width of each of the first leg portions 22 may gradually increase from the second connection portion 31 to the first connection portion 21. In other words, as the width of each of the first leg portions 22 connected to the first connection portion 21 increases, even when the flexible secondary battery 1 repeats a bending motion, the first leg portions 22 and the first connection portion 21 may maintain a stable connection state. Likewise, the width of each of the second leg portions 32 may gradually increase from the first connection portion 21 to the second connection portion 31.

Figure 7:
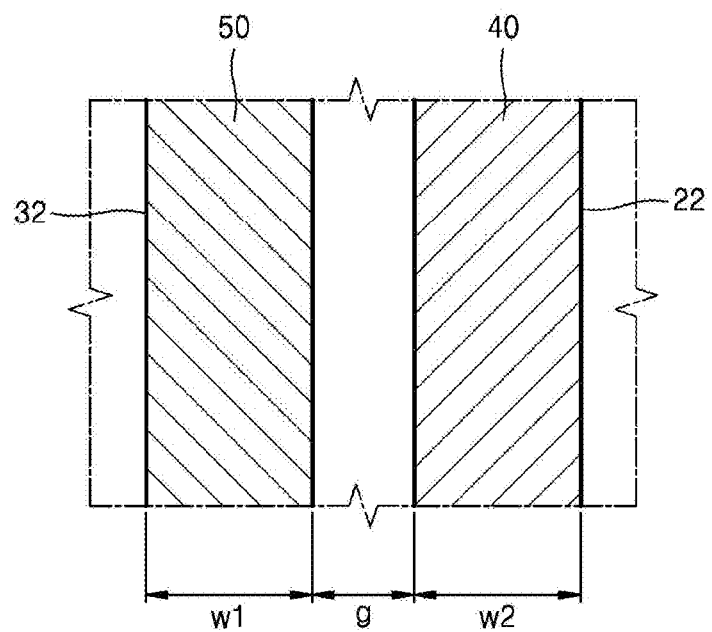
FIG. 7 is a schematic enlarged view of a portion Z of FIG. 2.

FIG. 7 is a schematic enlarged view of a portion Z of FIG. 2. FIGS. 8 to 11 are graphs showing charge/discharge properties of the flexible secondary battery 1 of FIG. 1. In the following description, FIGS. 1 and 2 are referred to together.

Referring to FIG. 7, the first leg portion 22 and the second leg portion 32 are parallel to each other, in which a gap g between the first leg portion 22 and the second leg portion 32 may be greater than about 0.5 mm and equal to or less than about 1 mm.

Figure 8:
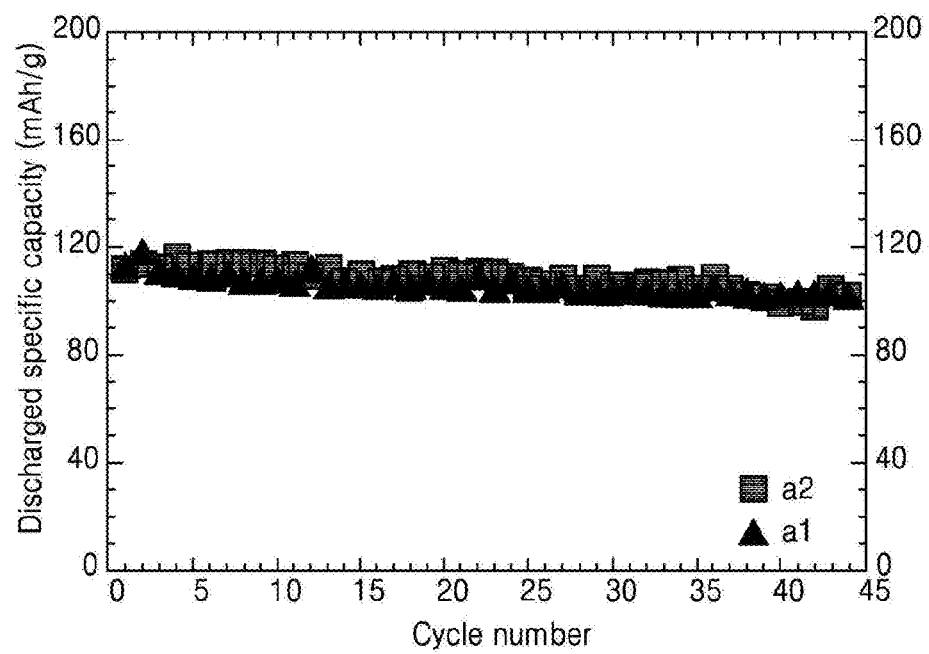
FIGS. 8 to 11 are graphs showing charge/discharge properties of the flexible secondary battery of FIG. 1.

FIG. 8 illustrates a result of measurement of electric capacity (discharge amount) according to the number of uses of the flexible secondary battery 1. In FIG. 8, "a1" denotes a case in which the cathode collector 20 and the anode collector 30 are manufactured to have the same size as those of the cathode collector 20 and the anode collector 30 described in FIG. 4A. However, "a2" of FIG. 8 denotes a case in which the gap g between the first leg portion 22 and the second leg portion 32 is about 0.5 mm in the cathode collector 20 and the anode collector 30 described in FIG. 4A.

As illustrated in FIG. 8, it may be seen that, while in the case of "a1" the electric capacity constantly decreases according to an increase in the number of uses of the flexible secondary battery 1, a fluctuation phenomenon occurs in the case of "a2", in which the electric capacity irregularly decreases according to an increase in the number of uses of the flexible secondary battery 1. Also, when the gap g between the first leg portion 22 and the second leg portion 32 is equal to or less than about 0.5 mm, dendrite may grow between the first leg portion 22 and the second leg portion 32. Accordingly, the gap g between the first leg portion 22 and the second leg portion 32, and furthermore, a gap between the cathode collector 20 and the anode collector 30, may be greater than about 0.5 mm.

When the gap between the cathode collector 20 and the anode collector 30 is relatively too great, an area efficiency of the flexible secondary battery 1 decreases. Accordingly, the gap between the cathode collector 20 and the anode collector 30, that is, the gap g between the first leg portion 22 and the second leg portion 32 may be equal to or less than about 1 mm.

Also, a width w1 of the first leg portion 22 and a width w2 of the second leg portion 32 may range from about 1 mm to about 3 mm.

When each of the width w1 of the first leg portion 22 and the width w2 of the second leg portion 32 is smaller than about 1 mm, resistances of the first leg portion 22 and the second leg portion 32 increase and thus an efficiency of the flexible secondary battery 1 may be reduced. In contrast, when each of the width w1 of the first leg portion 22 and the width w2 of the second leg portion 32 is greater than about 3 mm, since the cathode collector 20 and the anode collector 30 are placed on the same plane, an efficiency of electric charges moving in a lateral direction of the first leg portion 22 and the second leg portion 32 may be decreased. In other words, since electric charges located at the center portion of the first leg portion 22 and the second leg portion 32 move in the lateral direction of the first leg portion 22 and the second leg portion 32 across the cathode active material portion 40 and the anode active material portion 50, if each of the width w1 of the first leg portion 22 and the width w2 of the second leg portion 32 is greater than about 3 mm, a ratio in which lithium ions participate in the charge/discharge operation of the flexible secondary battery 1 may be reduced.

When the flexible secondary battery 1 having superior flexibility is bent, to effectively distribute stress applied to the first leg portion 22 and the second leg portion 32, a ratio of the length and the width w1 of the first leg portion 22 may be about 10:1 to about 200:1. When the length of the first leg portion 22 is ten (10) times smaller than the width w1, bending properties of the first leg portion 22 decrease and thus dislocation is generated in the first leg portion 22 due to a repeated bending motion of the flexible secondary battery 1 so that the first leg portion 22 may be cut. In contrast, when the length of the first leg portion 22 is two hundred (200) times greater than the width w1 and the flexible secondary battery 1 has a certain size, the width w1 excessively decreases and thus manufacturing of the flexible secondary battery 1 may be difficult. Also, as the resistance of the first leg portion 22 increases, the efficiency of the flexible secondary battery 1 may be reduced. Likewise, the ratio of the length and the width w2 of the second leg portion 32 may range about 10:1 to about 200:1.

Table 1 shows a result of an anode to cathode ratio according to the width w1 of the first leg portion 22, the width w2 of the second leg portion 32, and the gap g between the first leg portion 22 and the second leg portion 32. In Table 1, the anode signifies a state in which the anode active material portion 50 is coated on the anode collector 30, and the cathode signifies a state in which the cathode active material portion 40 is coated on the cathode collector 20. Also, the anode to cathode ratio (n/p ratio) is a value obtained by dividing an anode expected capacity by a cathode expected capacity, where the anode expected capacity signifies a quantity of lithium ions input or output at an anode and the cathode expected capacity signifies a quantity of lithium ions input or output at a cathode.

TABLE 1

|  | First leg portion with (w1, mm) | Second leg portion width (w2, mm) | Gap (g, mm) | Anode to cathode ratio |
|---|---|---|---|---|
| Embodiment 1 | 3 | 3 | 1 | 1.42 |
| Embodiment 2 | 2 | 2 | 1 | 1.55 |
| Embodiment 3 | 2 | 3 | 1 | 2.36 |
| Embodiment 4 | 3 | 2 | 1 | 1.10 |

As it may be seen from Table 1, all of Embodiments 1 to 4 have the anode to cathode ratios to be greater than about 1. This is because the cathode active material portion 40 formed on the cathode collector 20 is formed only on the first leg portions 22 in a size smaller than the area of each of the first leg portions 22, Accordingly, the quantity of lithium ions provided at the cathode is greater than the quantity of lithium ions received at the anode, there may be room for the movement of lithium ions during charge/discharge.

Figure 9:
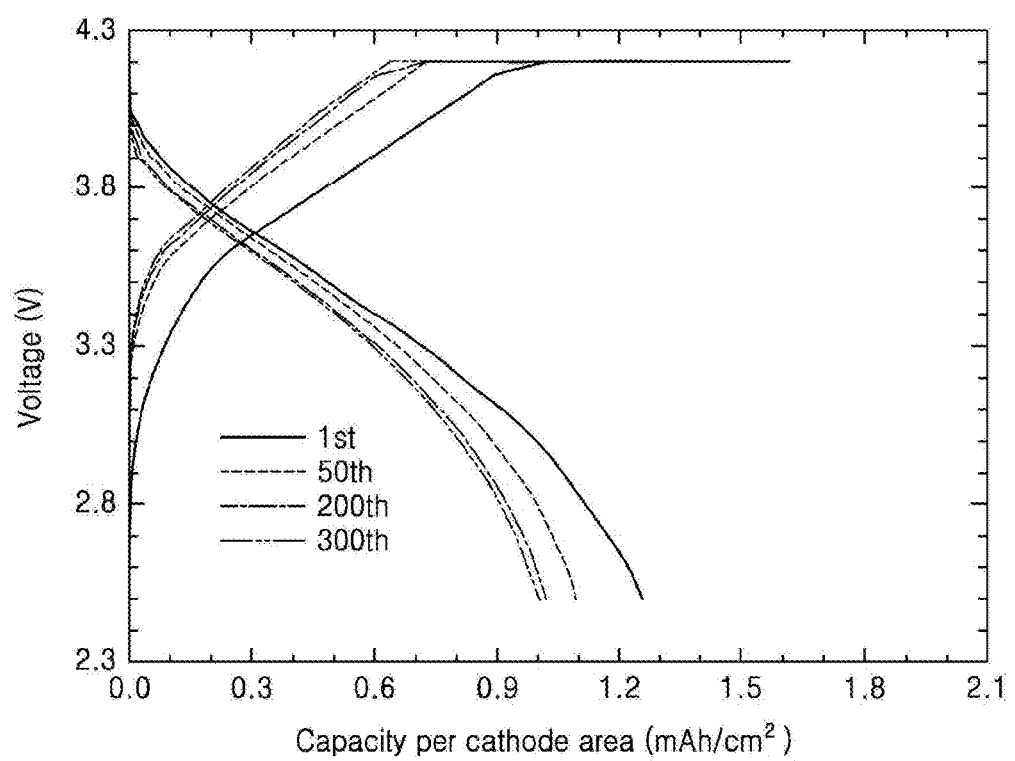
Figure 10:
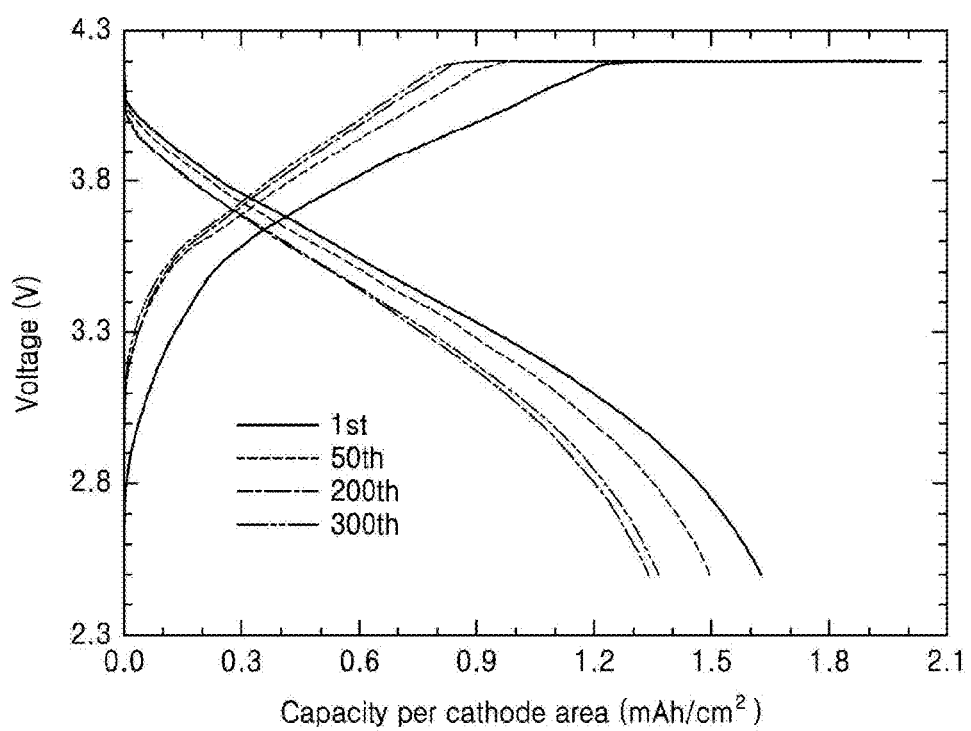
Figure 11:
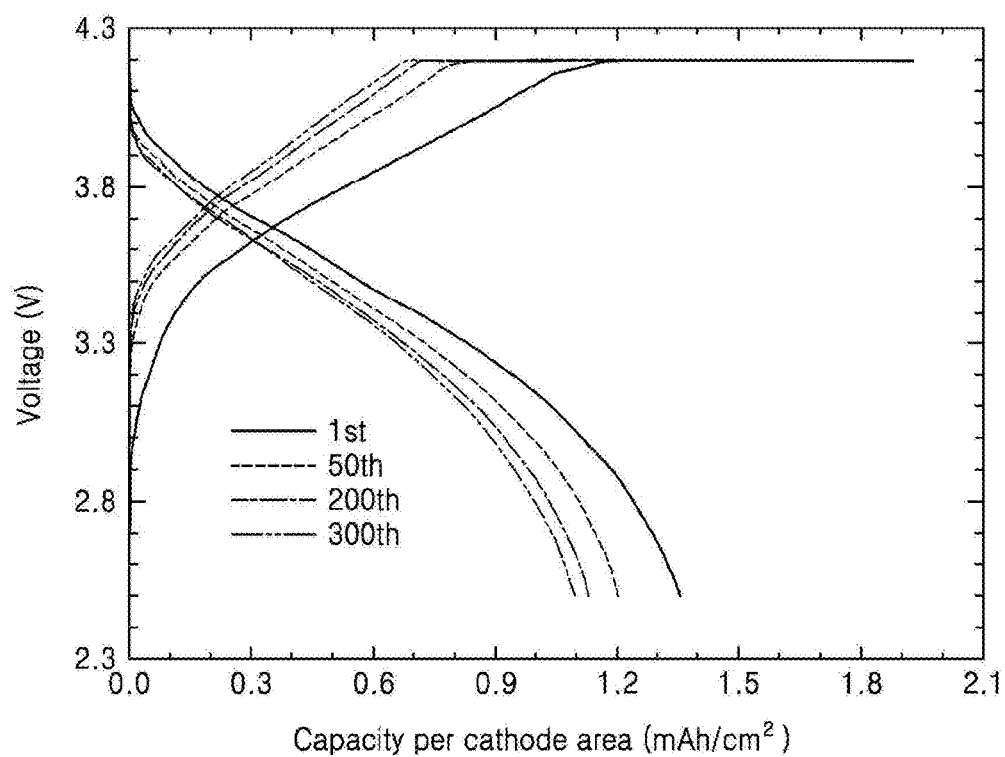

Table 2 shows a result of the efficiency of a flexible secondary battery according to Table 1. FIGS. 9 to 11 illustrate test results of capacity per cathode area (mAh/cm$^2$) according to three hundred (300) times of charges/discharges in Embodiment 1, Embodiment 2, and Embodiment 3 in Table 2.

TABLE 2

|  | Average Coulomb efficiency (%, 300$^{th}$) | 300$^{th}$ capacity per cathode area (mAh/cm$^2$) | Capacity maintenance rate (%, 300$^{th}$/1$^{st}$) |
|---|---|---|---|
| Embodiment 1 | 99.56 | 0.28 | 83.44% |
| Embodiment 2 | 99.90 | 0.33 | 80.69% |
| Embodiment 3 | 99.17 | 0.23 | 71.81% |
| Embodiment 4 | 99.98 | 0.34 | 79.16% |

As it may be seen from Table 2, an average Coulomb efficiency during the 300 times of charges/discharges is over 99% in all of Embodiments 1 to 4. Since the width w1 of the first leg portion 22 and the width w2 of the second leg portion 32 ranges from about 1 mm to about 3 mm, it may be seen that the flexible secondary battery 1 has superior battery properties. Furthermore, the average Coulomb efficiency during the 300 times of charges/discharges is over 80% in Embodiments 1 and 2. When the width w1 of the first leg portion 22 and the width w2 of the second leg portion 32 are identically formed, the battery properties of the flexible secondary battery 1 may be further enhanced.

As described above, in the secondary battery according to the present inventive concept, the extraction of lithium ions at an anode collector may be prevented and superior flexibility may be obtained.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A flexible secondary battery comprising:
an exterior member having an accommodation space inside;
a cathode collector and an anode collector located in the accommodation space and spaced apart from each other;
a cathode active material portion on the cathode collector; and
an anode active material portion on the anode collector, wherein the cathode collector comprises:
a first connection portion extending in a first direction; and
a plurality of first leg portions protruding from the first connection portion in a second direction different from the first direction,
wherein the anode collector comprises:
a second connection portion parallel to the first connection portion; and
a plurality of second leg portions protruding from the second connection portion toward the first connection portion,
wherein the plurality of first leg portions and the plurality of second leg portions are alternately arranged between the first connection portion and the second connection portion,
wherein the cathode active material portion is located only on the plurality of first leg portions, and
wherein the anode active material portion is located on the second connection portion and the plurality of second leg portions.

2. The flexible secondary battery of claim 1, wherein one end of the cathode active material portion close to the first connection portion is located on a same line as one end of each of the plurality of second leg portions close to the first connection portion, or closer to the second connection portion than one end of each of the plurality of second leg portions.

3. The flexible secondary battery of claim 2, wherein a shortest distance between the one end of the cathode active material portion and the same line is equal to or less than about 50% of a shortest distance between the one end of each of the plurality of second leg portions and the first connection portion.

4. The flexible secondary battery of claim 1, wherein one end of the cathode active material portion close to the first connection portion is located closer to the first connection portion than the one end of each of the plurality of second leg portions close to the first connection portion, and
a shortest distance between the one end of the cathode active material portion and the first connection portion is greater than about 50% of a shortest distance between the one end of each of the plurality of second leg portions and the first connection portion.

5. The flexible secondary battery of claim 1, wherein the cathode collector and the anode collector are arranged on a same plane.

6. The flexible secondary battery of claim 1, wherein an area of the plurality of first leg portions is larger than an area of the cathode active material portion.

7. The flexible secondary battery of claim 1, wherein the plurality of first leg portions and the plurality of second leg portions are parallel to each other, and
a gap between the plurality of first leg portions and the plurality of second leg portions is greater than about 0.5 mm and equal to or less than about 1 mm.

8. The flexible secondary battery of claim 7, wherein a width of each of the plurality of first leg portions and a width of each of the plurality of second leg portions range from about 1 mm to about 3 mm.

9. The flexible secondary battery of claim 8, wherein the width of each of the plurality of first leg portions and the width of each of the plurality of second leg portions are same.

10. The flexible secondary battery of claim 8, wherein a ratio of a length and a width of each of the plurality of first leg portions and each of the plurality of second leg portions ranges from about 10:1 to about 200:1.

11. The flexible secondary battery of claim 1, wherein a cathode tab and an anode tab are respectively connected to the cathode collector and the anode collector, and the cathode tab and the anode tab are exposed to outside of the exterior member.

12. The flexible secondary battery of claim 11, wherein the exterior member comprises a first exterior member and a second exterior member,
the first exterior member and the second exterior member are bonded to each other at edges of the first exterior member and the second exterior member, and
an insulating film is attached to outer surfaces of the cathode tab and the anode tab, contacting the first exterior member and the second exterior member.

13. The flexible secondary battery of claim 1, wherein one end of each of the plurality of second leg portions has a round shape.

14. The flexible secondary battery of claim 1, wherein a width of each of the plurality of first leg portions gradually increases from the second connection portion toward the first connection portion and a width of each of the plurality of second leg portions gradually increases from the first connection portion toward the second connection portion.

15. The flexible secondary battery of claim 1, wherein the first direction and the second direction are perpendicular to each other.

* * * * *